April 3, 1951  F. B. PFEIFFER  2,547,835
METHOD AND APPARATUS FOR WORKING SHEET MATERIAL
Filed Nov. 6, 1945  3 Sheets-Sheet 1

INVENTOR
Fred B. Pfeiffer
ATTORNEY

April 3, 1951  F. B. PFEIFFER  2,547,835
METHOD AND APPARATUS FOR WORKING SHEET MATERIAL
Filed Nov. 6, 1945  3 Sheets-Sheet 2

INVENTOR
Fred B. Pfeiffer
BY *Jesse R. Emerson*
ATTORNEY

April 3, 1951   F. B. PFEIFFER   2,547,835
METHOD AND APPARATUS FOR WORKING SHEET MATERIAL
Filed Nov. 6, 1945   3 Sheets-Sheet 3

INVENTOR
Fred B. Pfeiffer
BY Jesse R. Brown
ATTORNEY

Patented Apr. 3, 1951

2,547,835

UNITED STATES PATENT OFFICE 2,547,835

METHOD AND APPARATUS FOR WORKING SHEET MATERIAL

Fred B. Pfeiffer, Akron, Ohio

Application November 6, 1945, Serial No. 627,063

16 Claims. (Cl. 18—19)

This invention relates to an improved method of wrapping articles and to novel apparatus for practicing such method. The invention carries forward the broad inventive concept disclosed in my co-pending application Serial No. 193,214, filed February 28, 1938, and now issued as Patent 2,486,750 of November 1, 1949, and it adds thereto certain steps in the method and features of machine construction and operation having practical importance.

The invention contemplates wrapping or packaging either partly or completely various objects with a film or sheet of such a nature as to be capable of conforming to any desired shape to accommodate the object or article or material being wrapped or packaged. In some practices of the invention such film or sheet material is preferably moisture proof and impermeable to air and other gases and is heat sealable, that is, capable of having engaging portions fused when heated. One such material which is suitable for practicing the invention and which is commercially available is a rubber hydrohalide, more specifically a rubber hydrochloride, manufactured by the Goodyear Tire and Rubber Company of Akron, Ohio, under the trade name of "Pliofilm," such material being more specifically described in the Calvert Patent No. 1,989,632 of January 29, 1935.

One feature of the invention contemplates heating and stretching appropriate strips of wrapping material in such manner as to reduce the thickness of such strips without a substantial decrease in the width or surface area of said strips.

Another feature of the invention resides in novel combinations of simple mechanical elements making possible rapid repetition of packaging operations.

Still another feature of the invention is the provision for supplying film or wrapping material to a packaging station in a heated and softened condition suitable for the stretch-wrap packaging operation and the provision of heated means adapted to operate on restricted areas of the film or wrapping material whereby to fuse said film or wrapping material to partly or completely enclose an object, article or material being wrapped in said film or wrapping material and to secure the film or wrapping material about said object, article or material and to sever the separate packages one from the other.

Yet another feature of the invention is the provision for supplying a uniform temperature to the film or wrapping material before it reaches the wrapping station.

Another feature of the invention is the elimination at the wrapping or packaging station of any heated member of any substantial volume and thereby protecting the film or wrapping material from transferred heat sufficient to materially affect the temperature of the film or wrapping material.

Another feature of the invention is the provision in a wrapping machine of means for relative adjustment of its parts to facilitate interchange of cooperating wrapping station members whereby different sizes and shapes of objects, articles or material may be wrapped or packaged on the same machine.

One form of the invention, as practiced in covering confections such as lollipops, comprises ordinary supporting members on which is mounted a conveyor provided with successively spaced tubular sockets adapted to receive the handle of a lollipop to be wrapped and to retain the body portion of the lollipop in an upright position above the conveyor and to advance it into and through a wrapping station consisting of rotating cooperating members around which are led converging strips of film or wrapping material between which the lollipop is fed and wrapped. One of the cooperating members of the wrapping station is provided on each of its circumferential edge portions with a heated wire retained in a groove said wire in operation being heated to a temperature sufficient to fuse the converged strips of film or wrapping material as the converged strips are pressed together against said circumferential wire by a cooperating circumferential raised portion on the other cooperating member. In this form of the invention this circumferential wire is heated hot enough to fuse but not hot enough to sever the film or wrapping material. However it is to be understood that in other forms this circumferential wire may be hot enough to both seal and sever the film or wrapping material. One of the said cooperating members is provided on one or more transverse portions with a heated wire which is also retained and suspended in a groove said wire being heated to a temperature sufficient to both fuse and sever transversely the said converged strips as they are pressed together against the transverse wire as the transverse wire enters a cooperating groove in the other cooperating member. Obviously the placement of these wires, grooves and raised portions of the cooperating members may be in any one of several practical arrangements and such changes are within the conception of my invention.

Converging strips of film or wrapping material of proper width are led from two supply rolls toward each other, first onto a driven take-off roll and then across a space onto a driven heating roll and next onto the cooperating packaging station members. I prefer to have the surface of the heating roll and the cooperating packaging station member contact although it is to be understood that they may be spaced apart if found desirable and driven at different surface speeds. In the present arrangement the supply roll is an idler roll with a brake. The take-off roll has a surface speed of less than that of the heating roll so that as the strip material passes between them it is put under tension but since the strip of material is relatively inextensible until heated it does not stretch until it becomes heated by close association or contact with the heated roll thus localizing the stretching area of the said strip to a narrow transverse area substantially at the contact point of the strip and the heated roll. The curved surface of the heated roll anchors and prevents the edges of the strip of film or wrapping material from converging and the unheated portion of the strip being relatively inextensible does not stretch and therefore does not narrow. Accordingly it will be seen that this arrangement permits, if desired an extreme stretching of the strip longitudinally with practically no narrowing of the strip in width.

The cooperating members of the wrapping or packaging station are mounted for simultaneous rotation in opposite directions. These cooperating members have their surfaces formed with cavities of a size larger than the body portion of the lollipop to be covered. Or these said cooperating members may be in the form of a pair of annular supporting members spaced from each other in axial alignment and mounted for rotation in unison and having one or more circumferentially spaced cross-members which may be in the form of a bar or bars to form a squirrel-cage-like device, or the peripheral cross-members may extend to a hub to form a device on the order of a paddle wheel. In any of these arrangements or modifications thereof the strips of film or wrapping material are led onto each of the cooperating members the said strips overlying the circumferential edge portions of the wrapping station and are held from drawing down between these edges by the strip material folding over the outside edges of the cooperating members. This folding of the material is due to the film or wrapping material being softened by heat and under tension and therefore capable of stretching down about the said edges. The strips will be bridged over the edges and the cross-members of the wrapping station and the body of the lollipop being conveyed toward the wrapping station by the conveyor, as has been described, passes into the bite of the wrapping station members the movements of the feed of the lollipop and the rotation of the cooperating wrapping station members being timed so that the lollipop is caught between the strips of film or wrapping material at a point over cooperating cavities or opening in the wrapping station members. The heated and softened film stretches about the lollipop body and is fused together about it by the separate strips of film being pressed together against the said circumferential heated wire and accordingly successive lollipops are wrapped and the wrapped lollipops separated from each other by the web of film or wrapping material of the two strips between the successive lollipops being pressed against the heated wire suspended in the groove of the transverse or cross-member of the wrapping station and thereby being both fused together and severed transversely between the said wrapped lollipops thus completing the wrapping of the confection.

The foregoing and other objects, features and advantages of the invention will be readily appreciated from the following description in connection with the accompanying drawings wherein one form of the invention has been shown by way of illustration, and wherein.

Referring more particularly to the drawings it will be seen that the invention as therein illustrated is embodied in a machine for wrapping a confection of a type known as lollipops. Each confection comprises a handle A, having on one end a piece of candy B of any ordinary or preferred size and shape. A plurality of these confections are placed successively in a series of tubular sockets 10 carried by an endless conveyor belt 11 which runs over and between a pair of suitable idler pulleys, not shown, which guide and tension the belt. The belt 11 is supported in its forward travel on angle iron members 22 and 23.

The sockets 10 are attached to the belt 11 by the belt being clamped between units 12 and 13 which are screwed on suitable threads not shown on the ends of sockets 10. It is to be understood that the nut 12 may be so shaped as to facilitate the easy insertion of the end of the handle A into the socket 10 as for example by countersinking or funneling. The nuts 12 and 13 engage driven sprockets 14 and 15 whereby the belt 11 is actuated. The sprockets 14 and 15 are spaced apart to permit the belt 11 to pass between them. These sprockets 14 and 15 are slidably attached by means of splined key to a driving shaft 16. The driving shaft 16 is driven through a reduction gear 17, pulleys 18 and 19 and belt 20 driven by a motor 21. The pulleys 18 and 19 are held suitably attached to the drive shafts of the reduction gear 17 and the motor 21.

The driving mechanism just described is supported on an iron angle member 30 which in turn is supported by means of adjusting bolts 31 rigidly attached to angle member 30 and adjustably attached to an angle member 32 by means of adjusting nuts 33 and 34. The angle member 32 is supported by suitable legs 35.

The iron angle member 30 also serves as a support for two bearings 40 which support two bearing support rods 41. Slidably adjustable on rods 41 are mounted feeder roll bearings 42 and 42a; heater roll bearings 43 and 43a; cooperating wrapping station member bearings 44 and 44a; and sprocket chain tension adjustment bearing 45. These bearings are of a conventional split bearing type which allow for the removal and replacement of the shafts that operate therein by removing the cap of the bearing from the portion of the bearing which is held in position on the slide rods 41. By reference to Fig. 2 it will be seen that these said caps are attached to the slidable portion of the bearings by means of slatted cap retainer screws shown but not identified. Said bearings 42, 42a, 43, 43a, 44, 44a, and 45 are held in any desired position on the slide rods 41 by means of set screws 47. Accordingly these bearings can be moved to any desired position on the slide rods to accommodate various diameters of rolls and wrapping station members which may be found necessary to use in wrapping articles of various sizes. It will also be noted by reference to Fig. 2 that the complete assembly supported by angle 30 may be raised or lowered to any desired operative position by means of its supporting rod 31 being raised or lowered by adjustment of locking nuts 33 and 34. It is pointed out that as this assembly is raised or lowered the shaft 16 will slide through the sprockets 14 and 15 leaving said sprockets in their proper plane in reference to the belt 11. Rotatably mounted in bearings 42 and 42a are feed rolls 50 and 50a respectively with sprockets 51 and 51a attached to feed rolls 50 and 50a respectively. Rotatably mounted in bearings 43 and 43a are heater rolls 52 and 52a respectively with sprockets 53 and 53a attached to heater rolls 52 and 52a, respectively. Also rotatably mounted in bearings 44 and 44a are wrapping station members 54 and 54a respectively with sprockets 55 and 55a attached to wrapping station members 54 and 54a respectively. Rotatably mounted in bearing 45 is sprocket chain tension adjustment sprocket 56. A sprocket chain 57 is driven by means of sprocket 58 attached to driving shaft 16. This sprocket chain 57 drives sprockets 51, 51a, 53, 53a, 55, 55a and 56.

Film or wrapping material supply rolls C and D are mounted on turntables 71 and 71a which revolve in bracket bearings 72 and 72a which in turn are rigidly attached to angle iron support member 32 by means of bolts 73 and 73a. The supply rolls C and D are provided with braking mechanism consisting of a movable brake-shoe 74 and 74a respectively pivotally mounted on brackets 72 and 72a by means of pivot pin 75 and 75a. The brake-shoes 74 and 74a are held in frictional contact with the supply rolls C and D respectively by means of tension springs 76 and 76a respectively.

Strips E and F are progressively drawn from supply rolls C and D respectively by means of the driven roll 50 and 50a respectively. These rolls 50 and 50a are not heated and have sufficient frictional surface contact with the strip of film or wrapping material to prevent any slippage of the said film or wrapping material on the surface of the rolls 50 or 50a. The surface travel of rolls 50 and 50a are governed by the ratio of the number of teeth in the sprocket 51 and 51a respectively to the drive sprockets 58.

Strips E and F travel from roll 50 to roll 52 and from roll 50a to roll 52a. The rolls 52 and 52a are heater rolls and are spaced sufficiently to prevent any substantial transfer of heat from the said heating rolls to the rolls 50 and 50a thus maintaining the material of E and F in a relatively cold condition until it comes into close proximity with the said heated rolls. These heated rolls 52 and 52a consist of a rotatable cylindrical liquid container member 52 and 52a containing a liquid 80 for retaining heat at a constant temperature. Emersed in the liquid are heating elements 81 and 81a and a thermostat 82 for regulating the temperature of the said liquid. The said heater members 81 and 81a and the thermostat members 82 and 82a are rigidly supported on bearings 43 and 43a with the result that the liquid in the revolving members 52 will be agitated by means of the stationary members 81 and 81a and 82 and 82a and thereby insure a uniform temperature throughout the liquid and also prevents localized heating of the liquid retaining member in the wall adjacent to the heater element. The said strips E and F continue their travel by passing between roll 52 and wrapping station member 54, and roll 52a and wrapping station member 54a these wrapping station members being cooperating members between which the strips E and F converge in portions of the said strips surfaces whereby the strips are stretched about the lollipop or other article or material to be covered.

Figure 6:
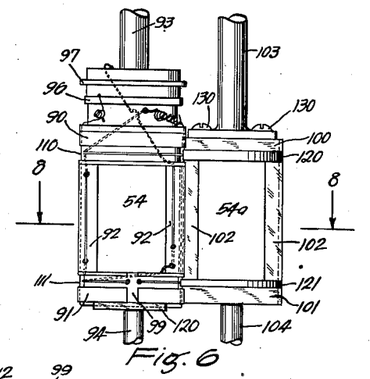
Figure 6 is a front view of the members comprising the wrapping, sealing and severing station.

The member 54 consists of a frame comprising disk-like end portions 90 and 91, and transverse connecting members 92. This member 54 is supported on shafts 93 and 94 and a shaft 93 is attached to the driving sprocket 55 while the shaft 94 is extended below the angles 22 where it is pulled toward a shaft 104 in any suitable manner as by means of a tension spring 95 the end of the shaft 104 being extended from wrapping member 54a. Adjacent to portion 90 is mounted in a suitably insulated manner an electrical collector ring 96 and adjacent to member 96 is a second insulated electrical collector ring 97. Traversing the length of bars 92 and in their outside faces are grooves 98 and 98a. In end portion 91 are formed semi-circular grooves 99 adapted to receive the handles A of the lollipops B permitting said handles A to lie below the periphery of the end member 91. In the peripheral edges of end members 90 and 91 are formed grooves 110 and 111 respectively. A resistance wire 112 is attached at one end to collector ring 97 and is extended through an insulated channel, not identified, to a groove 111 at a point 113 at which point it is brought to the bottom surface of the groove 111. This wire 112 extends around the bottom of the said groove 111 to a point 114. From point 114 the wire 112 continues through an insulated channel, also not identified, to groove 110 at a point 115. From point 115 the wire 112 extends around the bottom surface of groove 110 to a point 116. From the point 116 said wire 112 continues to a point 117 where it is connected to a wire 118 which is of a smaller cross-sectional area than that of wire 112. This wire 118 is suspended from end member 90 to end member 91 in a path following the central portion of the grooves 98. As shown at a point 119 the wire 118 extends through an insulator washer 120 (see Fig. 6) to a point 121. From point 121 wire 118 is suspended from end member 91 to end member 90 through the central portion of the groove 98a to a point 122 from which it extends to collector ring 96 to which it is connected.

The member 54a is adapted to cooperate with member 54 and is adapted for rotation in opposite direction to the rotation of member 54. This member 54a consists of a frame comprising disklike end portions 100 and transverse connecting members 102 such members having formed in their longitudinal faces grooves 108 and 108a said grooves 108 and 108a being positioned to cooperate with the grooves 98 and 98a respectively to arch over the suspended wire 118 in said grooves 98 and 98a. End members 100 and 101 are provided with projecting rims 120 and 121 respectively. These projecting rims are adapted to cooperate with grooves and are positioned at sufficient depth to contact the wire 112 which lies on the faces of the bottom of the grooves 110 and 111. This member 54a is provided with a shaft 103 attached thereto by means of screws through a flange on the end of said shaft. The said shaft is driven by sprocket 55a.

Figure 2:
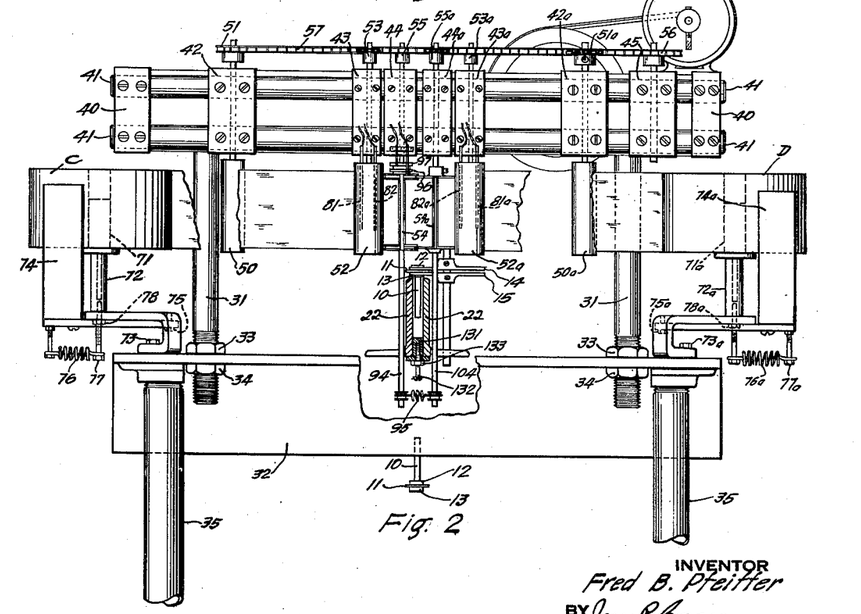
Figure 2 is a sectional front end view thereof.
Figure 3:
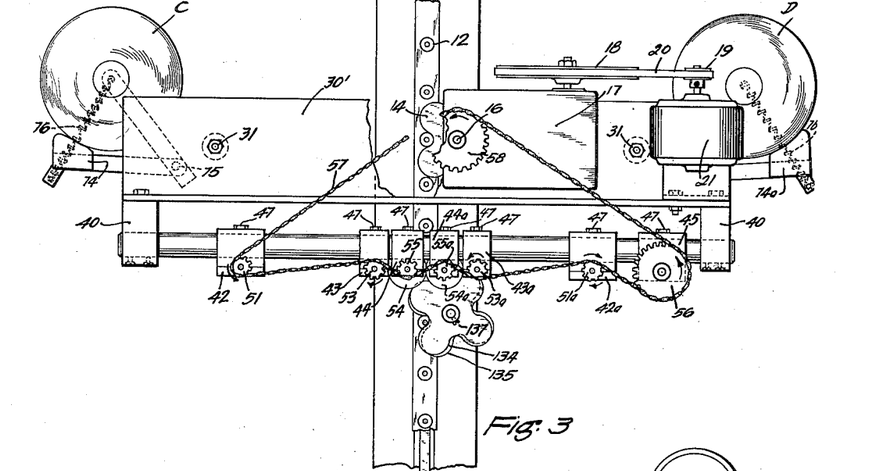
Figure 3 is a top plan view of the same.
Figures 5, 7:
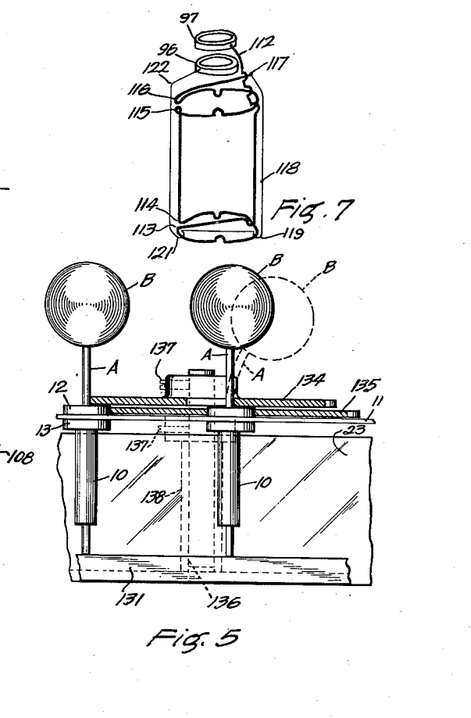
Figure 5 is a fragmentary detail side view showing means for maintaining the proper elevation and correct spacing of lollipops as they enter the wrapping stations.
Figure 7 is a diagrammatic view of the wiring shown in Figure 6 and electric current delivery means to said wiring.

Referring now to Fig. 5 it will be seen that the lower end of the handles A of the lollipops slide on an adjustable strip 131 as they are carried forward by means of the conveyor belt sockets 10. The adjustment of this strip, as will be seen by reference to Fig. 2, is effected by means of adjustable screws 132 maintained in selected position by a lock unit 133. In Fig. 5 is illustrated a means of positioning the portion B of a lollipop as it enters the wrapping stations as has been found necessary in cases where crooked or bent lollipop handles are used. Such handles are frequent in cases where flexible handles are used. This positioning is accomplished by means of two driven sprockets 134 and 135. The sprocket 134 overlies sprocket 135 in an advanced position as will be seen by reference to Fig. 3. Referring again to Fig. 5 it will be seen that the sprockets 134 and 135 are attached to a shaft 136 by means of set screws 137. The shaft 136 runs in a bearing 138 this bearing being supported on the flange of angle member 22. The sprocket 135 is driven by the socket units 12 as they move forward with the travel of the conveyor belt 11 and this actuates the shaft 136 to which the sprocket 134 is attached and in the manner said sprocket 134 is rotated. The sprocket 134 is positioned on its shaft 136 so that its teeth are above the tops of the nuts 12 and the edges of said teeth will pass on a line tangent to the hole in socket 10 so that a bent handle of a lollipop is prevented from lagging by the edges of said teeth urging the lollipop forward as is diagrammatically shown in Fig. 5.

Coming now to the operation of the device: The handles A of lollipops are placed in the sockets 10. This may be done manually or automatically as the conveyor belt 11 moves toward the wrapping station the belt being actuated by means of the motor 21 driving through the motor pulley 19, belt 20, reduction gear pulley 18, reduction gear 17, shaft 16 and sprockets 14 and 15 which sprockets 14 and 15 engage nuts 12 and 13 respectively whereby the belt is given a continuous forward motion carrying the sockets 10. While I have shown the belt to be actuated in a continuous motion it is to be understood that intermittent motion may be accomplished by means of rachets or like as will be readily understood by those skilled in the art. As the lollipops approach the wrapping station they are maintained at a predetermined elevation by the lower ends of the handles A sliding along the top surface of the strip 131. The purpose of this elevation strip 131 is to maintain the body portions B of the lollipops in proper position as it passes through the wrapping stations 54 and 54a so that the wrapper will have the desired marginal dimension around the body portions B. If it is desired to change the elevation of the body portion B of the lollipops this may be accomplished by manipulating adjusting screw 132 and lock nut 133. In practice not all lollipop handles are straight and accordingly the body portions B of some of the lollipops are not central with the socket 10. Any off-center condition of the body said portions sidewise or forward do not produce objectionable results but an off-center body portion that leans backward, if not corrected, will result in the body portion B being caught between the transverse bars 92 and 102 of the wrapping station as they rotate toward each other. To avoid this the handles A are engaged by the sprocket 134 which urges and retains the body portion B forward into a central position which action occurs at the moment bars 92 and 102 of the wrapping station start to approach each other. Rolls C and D of suitable film or wrapping material as of "Pliofilm" of proper width are placed on the roll holders 71 and 71a respectively. The strip E from roll C is placed in operative position by being led partially around a take-off roll 50, thence partially around a heater roll 52 and thence partially around wrapping station member 54. The strip F from roll D is similarly led around rolls 50a, 52a and wrapping station member 54a. The stock rolls C and D are not driven but the members 50, 52, 54, 50a, 52a and 54a are driven by means of the sprocket chain 57 which is driven by sprocket 58, which in turn drives those last mentioned members through sprockets 51, 53, 55, 51a, 53a and 55a respectively. Said sprocket chain 57 is kept in correct operating tension by means of adjustable sprocket 56. Sprocket 58 attached to main drive shaft 16 through the medium of sprocket chain 57 and sprockets 55 and 55a position members 92 and 102 parallel with the path of the belt 11 and at the same instant the sprocket 14 and 15, also attached to the drive shaft 16, positions socket 10 centrally between said wrapping station members 92 and 102. Thus it will be seen that a lollipop body portion carried forward by its handle being inserted in socket 10 will pass the center line $x$—$x$ shown in Fig. 4 of the wrapping station members at the moment the wrapping station bars 92 and 102 are at right angles to said center line. Returning now to the film or wrapping material supply the strip E as it passes around the roll 50 is held in not slipping contact with said roll by means of the tension exerted on the strip by the dragging action of the brake 74. Since no slippage occurs on the roll 50 the surface travel of the roll and the strip E will be the same. The surface travel of the heated roll 52 is more than the surface travel of the take-off roll 50. Due to the high frictional resistance to slippage of the film or wrapping material with the heated surface of roll 52 no slippage between the strip E and the roll surface 52 will occur. Because the strip E is delivered from roll 50 to roll 52 at a slower rate of travel than the travel of roll 52 the strip E is stretched. The strip E is relatively inextensible at normal temperatures and accordingly the length of strip E between rolls 50 and 52 will remain in its original condition until it comes to close association with or contacts the heated roll 52 and at that line of contact with roll 52 a continuous elongation of the strip E will take place. However due to the adherence of the heated film or wrapping material to the curved surface of the contacted surface of the roll 52 the width of the strip E will be substantially maintained and the gauge will be reduced in proportion to the increase of travel of roll 52 over that of roll 50.

Due to the flexibility of the method and apparatus involved in this invention it is evident that commercially some users will find it advantageous to use one machine to package various kinds of articles or material. In this event it may be desirable that the film to be suitable for packaging one type of article should be decreased in gauge from that of the material of the supply roll while for another article of different type a material of an increased gauge from that of the supply roll may be desirable. The reductions of gauge of the material on the supply roll has been thoroughly discussed and for the sake of brevity it is considered advisable to point out only briefly that to increase the gauge of the strips of film or wrapping material E and F it will only be necessary to increase the surface travel of the take-off rolls to a speed of travel greater than that of the heating rolls thereby crowding the strip material onto the heater rolls. Obviously, it may be desirable to employ an idler roll or other means not shown to press the strip of material in non-slipping contact with the take-off rolls and of course when the crowding operation is to be employed the take-off rolls should be moved to a position close to the heating rolls. As will now be readily understood this invention contemplates means for decreasing the gauge of the film or wrapping material and also to increase its gauge if desired and of course no change in gauge need be made in those cases where the original gauge of the film or wrapping material is satisfactory.

In a packaging operation of the type employed in this invention it is vitally important that the thin film or sheet of wrapping material be heated a uniform required temperature. Since the thickness of said film or wrapping material used may be as thin as one-thousandth of an inch or less it will acquire in a vary short interval of time any variation of temperature from any heat medium to which it is exposed. Heat supply medium heretofore known are not satisfactory for use in the operation of this invention. However the roll 52 and 52a has overcome these faults by means of their construction as has been previously described.

Figures 8, 9:
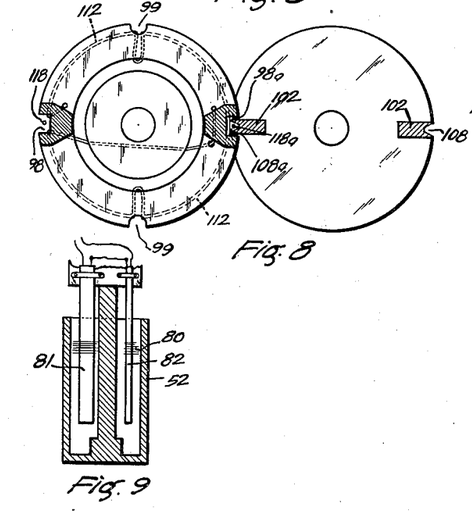
Figure 8 is a cross-sectional view taken on line 8—8 of Figure 6 and drawn to larger scale.
Figure 9 is a detail cross-sectional view of the film or wrapping material heating roll showing the heat supply means, the heat stabilizer liquid and the thermostatic control thereof.

The strips of film or wrapping material E and F travel from rolls 52 and 52a to wrapping station members 54 and 54a. By reference to Figs. 6 and 8 it will be seen that these two members 54 and 54a are of a squirrel cage type and are shown with circular end members connected by means of transverse bars. The film or wrapping material contacts the wrapping station 54 on the surface of end members 90 and 91 and bridges the grooves 110 and 111 and as this member rotates the film or wrapping material lies on the outer surface of the transverse members 92 and bridges the grooves 98. A material such as "Pliofilm" when heated and anchored to different points it tends to assume a straight line to the points. It will thus be seen that the film when anchored to end members 99 and to transverse bars 92 it will assume the convex contour of end member 90 and 91 and will also assume a relatively flat plane across the space between the bars 92 thus forming a pocket like cavity. As the film is delivered from heater roll 52a to wrapping station member 54a the film or wrapping material will lie in the same relative position as it will lie on the male protruding surfaces 120 and 121 on the end members 100 and 101 respectively and the surfaces of 102 bridging the grooves 108 and 108a. The film or wrapping material from its point of contact with wrapping station 54 to the point where it contacts projections 120 and 121 of end members 100 and 101 respectively of wrapping stations 54a does not touch circumferential wires 112 or the transverse wires 118. By suitable brushes, not shown, a suitable controlled electrical current is caused to circulate through the wires 112 and 118 in series from collector ring 97 to collector ring 96. The wire 112 which lies in the circumferential grooves 110 and 111 is of a sufficiently larger predetermined gauge than wire 118 which lies in the transverse grooves 98 and 98a to cause a sealing temperature to be imparted to the said wire 112 and a severing temperature to be imparted to wire 118. This variation of temperature of these wires is due to the difference of their cross-sectional area both being composed of the same material. Obviously to those skilled in the art the desired temperatures in these wires may be obtained electrically in different ways as for example bringing the supply of electrical current to wires 112 and 118 independently and controlling the temperature of each independently and it is to be understood that such changes are within the conception of my invention. It is also within the conception of this invention to interrupt the flow of current at any interval or in any portion of the electrical circuit.

Figure 4:
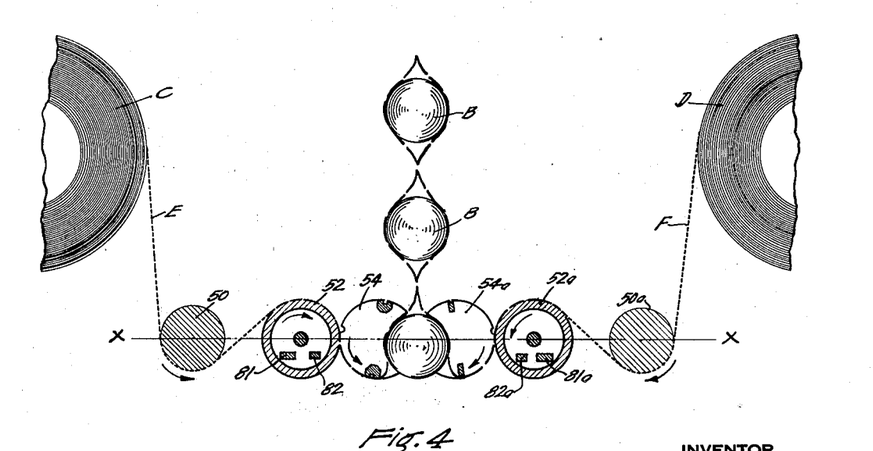
Figure 4 is a diagrammatic view showing the course of the film or wrapping material from the supply roll about the various members of the apparatus to its position on objects being covered.

The strips E and F progressively converge at the points where the wrapping stations 54 and 54a contact which is approximately on the center line $x$—$x$ shown in Fig. 4. The temperature imparted to the film or wrapping material by roll 52 and 52a is the minimum temperature required to condition the film or wrapping material to properly shape the required receptacle and extend to cover an object, article or material being packaged. In most cases this temperature just referred to is lower than that required to cause the converged strips E and F to fuse or seal, consequently, it is necessary to further heat the film or wrapping material at the points where it is to be fused or sealed together. It is important that the temperature of the film or wrapping material except at the immediate sealing point be maintained at the temperature it is delivered to the wrapping station and that no substantial rise in temperature occurs accordingly heated rolls have been found to be impractical due to the transfer of heat from such heated rolls to the film or wrapping material. As the strips E and F progressively approach the line $x$—$x$ as mentioned above they are forced from their bridged position over the grooves 110 and 111 against the sealing heated wire 112 by means of the projections 120 and 121. It is to be noted that the strips E and F are in contact with one another before they are forced into the said grooves against the sealing wire. The contact of these converged strips with the heated wire 112 is only momentary and not until the separate strips are in contact with each other. This is important as continued contact with a surface hot enough to effect fusing of the film or wrapping material results in a rupture and objectionable thinning down of the film or wrapping material. This progressive contact with the sealing wires seals or fuses the strips E and F along their marginal edges except at the grooves 99 where no contact is made with the heated wires.

As the film or wrapping material converges into contact over grooves 98a and 108a a short distance prior to reaching center line x—x the film or wrapping material of strips E and F are pressed toward wire 118 by transverse bar 102. When the bars 92 and 102 reach the center line x—x wire 118 will have severed the strips E and F across their transverse width by having forced the hot wire 118 through said strips into groove 108a. It is important at this point to note that the strips E and F are in firm contact with each other before they are pressed against the heated cut-off wire 118 which lies below the surface of the bar 92. This results in a transverse seal of the strips E and F and then the severing through the center of this sealed portion resulting in two sealed edges one on each side of the severing wire. If the operation just described was continued without feeding lollipops or other articles through the wrapping station it is obvious that the strips E and F of film or wrapping material would be formed into a series of pillow-like receptacles. It will also be seen that by omitting wire 112 in groove 111 that sacks with an open end or edge would be formed. It will further be seen that various shapes and outlines of receptacles and packages can be made by corresponding changes in the shape of the wrapping station members 54 and 54a. It is to be understood that the forming of such articles and receptacles are within the scope of my invention.

Now returning to the operation of passing the lollipops through the wrapping station whereby to cover the lollipop body portions B and that portion of the handles A that is adjacent to the said body portions, it will be seen that as the lollipops are advanced through the wrapping station by having their handles inserted in sockets 10 they will be encased in the pillow-like receptacles just described. However, as in the case of the lollipop, where the body portion B is larger than the receptacle being formed, the body will be pressed against the heated film or wrapping material thereby increasing the volume of the receptacle without displacing the wrapping material from its held portions on the transverse bars and end members of the wrapping station members.

In practice it is desirable to have a packaging machine capable of packaging or wrapping articles of different sizes and shapes. Various types of articles, shapes and materials may be wrapped or packaged with the machine and method comprising this invention. Obviously different shapes and sizes of articles will require different sizes and styles of wrapping station members and to disclose the manner of accommodating the machine for such changes will not be discussed in relation to packaging lollipops of various sizes.

Figure 1:
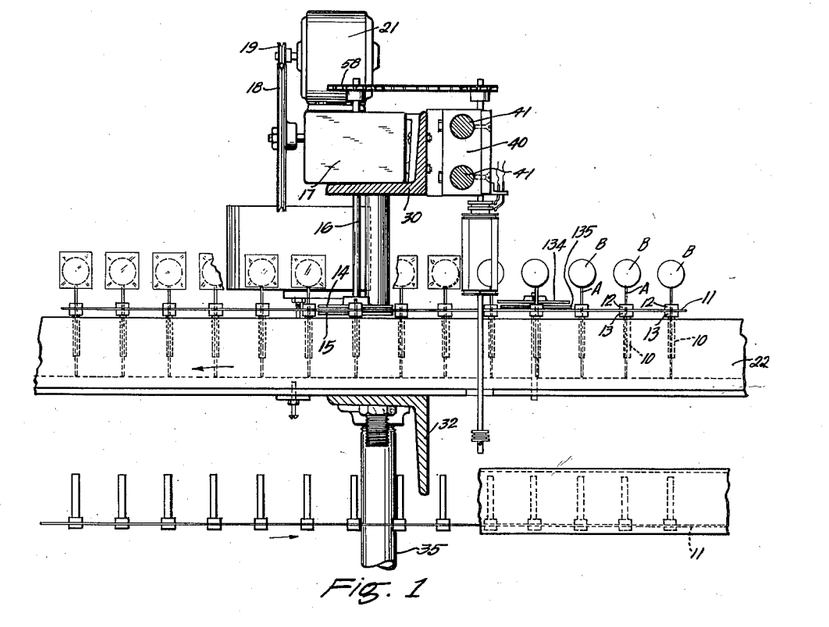
Figure 1 is a fragmentary side view of one form of machine for practicing the novel method in conjunction with the wrapping of confections.

Should it be desired to wrap a larger lollipop than that illustrated in Fig. 1 sufficient space is available between the body portions of the lollipops for a larger body portion to be carried by the handles in the conveyor belt sockets and still have space for the wrapping station members 92 and 102 to cooperate between said body portions. This larger body portion may require a different dimensioned wrapping station 54 and 54a A change of said stations is made by substituting a suitable pair of wrapping station members for the ones previously in use. As has been indicated in the detailed description of the mechanism this change of wrapping station members will be accomplished as follows: The idler sprockets 56 are moved so as to release the tension on chain 57 and bearing caps 44 and 44a are removed thereby allowing wrapping station members 54 and 54a with its sprockets 55 and 55a to be moved from their respective bearings. Bearings 43, 43a, 44 and 44a are shifted to their desired position on rods 41. The set screws 47 are loosened and tightened to accomplish the relocation of said bearing. The wrapping station members to be substituted are placed in their respective bearings with the sprockets 55 and 55a attached in operative position. If different members 50, 50a, 52 and 52a are required they may be substituted in similar manner to that of the packaging station members. Substitution of different members may make realignment of the strips E and F desirable and this is accomplished by the adjusting screws 77 and 77a on the roll holder 71 and 71a. Obviously this interchangeability of members makes possible selective arrangements whereby the rate of travel of the film E and F on members 50 and 52, and 50a and 52a respectively to affect the thickness of the film or wrapping material in their progressive travel to the wrapping station.

From the foregoing it will be evident that I have provided novel method steps and apparatus for covering various articles. If necessary to facilitate its proper shaping, the film or wrapping material may be softened either by heat or by moisture or otherwise, dependent upon the inherent properties of the particular material selected. Obviously the invention is susceptible of numerous modifications and the right is herein reserved to make such changes as fall within the scope of the appended claims without departing from the spirit of the invention.

This application is a continuation in part of application Serial No. 193,214, filed February 28, 1938, and now issued as Patent 2,486,750 of November 1, 1949.

I claim:

1. In the method of continuously wrapping successive articles in thermoplastic sheet material, the combined steps of continuously feeding converging strips of such material toward each other, simultaneously heating and stretching said strips before they reach the wrapping position, immediately thereafter presenting an article to wrapping position and partly enclosing the same between the two strips, and supplying additional heat to fuse mutually engaging portions of the converging strips to complete the enclosure of the article.

2. In the method of continuously wrapping successive articles in thermoplastic sheet material, the combined steps of continuously feeding two converging strips of such material toward each other, simultaneously heating and stretching said strips before they reach the wrapping position, immediately thereafter presenting an article to wrapping position where said material is subjected to additional stretch by the article being wrapped being pressed against said material, and supplying additional heat to fuse mutually engaging portions of the converging strips to complete the enclosure of the article.

3. In the method of continuously wrapping successive articles in thermoplastic sheet material, the combined steps of continuously feeding two converging strips toward each other to meet adjacent to a wrapping station, heating said sheets by surface contact with a pair of heating rolls adjacent to but in advance of the wrapping station, such heating being only sufficient to soften the sheet material to facilitate its manipulation about the article to be wrapped, presenting an article to position between the converging warmed sheets at the wrapping station, completing the enclosure of the article between the strips of sheet material and at the same time supplying additional heat to fuse the mutually engaging portions of the opposing strips.

4. In a method of packaging, the novel steps of continuously feeding two strips of thermoplastic sheet material in convergence toward a wrapping station, heating the sheet material strips immediately before they pass to the wrapping station, then presenting an article to be wrapped at the wrapping station in such a way as to effect pressure contact between the opposite sides of said article and said opposing strips of wrapping material and thus to enclose said article, and applying additional heat to simultaneously seat the enclosed article and to sever it from the following strip material.

5. In the method of continuously wrapping successive articles in thermoplastic sheet material, the combined steps of continuously feeding two converging strips of such material toward each other, simultaneously heating and subjecting said strips to linear stretch while preventing the strips from narrowing thereby reducing the gauge and increasing the surface area of the strips, immediately thereafter presenting an article to the wrapping position where said material is subjected to additional stretch by the article being pressed against said material, and supplying additional heat to fuse mutually engaging portions of the converging strips to complete the enclosure of the article.

6. In the method of continuously wrapping successive articles in thermoplastic sheet material, the combined steps of continuously feeding two converging strips of such material toward each other, simultaneously heating and subjecting said strips to linear stretch while preventing the strips from narrowing thereby reducing the gauge and increasing the surface area of the strips, and immediately thereafter presenting an article to the wrapping position where said material is subjected to additional stretch by the article being pressed against said material.

7. The method of packaging articles in heat-stretchable and heat-sealable sheet material, consisting in continuously feeding strips of said material in opposed relation to each other, heating said strips progressively and concurrently in two stages, first, in advance of the wrapping station and to a non-fusing temperature to render them stretchable, and, second, at the wrapping station to a fusing temperature to render them sealable, pressing small areas of longitudinal zones of said strips into contact with each other progressively at the wrapping station to form longitudinal seals, pressing small areas of transverse zones of said strips into contact with each other progressively at the wrapping station to form transverse seals, and depositing an article between said strips subsequently to the formation of one transverse seal and prior to the formation of the next following transverse seal to form a chain of hermetically sealed packages, each containing an article.

8. The method according to claim 7, wherein the heating of the strips in the first stage is effected throughout their entire width and wherein the heating of the strips in the second stage is confined to the small areas which are pressed into contact to form the longitudinal and transverse seals referred to.

9. The method according to claim 7, wherein the heat-sealing of the strips in the transverse zones is accompanied by a heat severance of a preceding package from the next following package.

10. In the method of continuously wrapping successive articles in a thermoplastic sheet material, the novel steps of continuously feeding a strip of such material toward the wrapping station, softening the strip by heat and then stretching it longitudinally while preventing it from narrowing, thereby reducing the gauge and increasing the area of the strip, and thereafter manipulating the softened stretched strip at the wrapping station to enclose the article.

11. In the method of continuously wrapping successive articles in a thermoplastic sheet material, the novel steps of continuously feeding a strip of such material toward the wrapping station, softening the strip by heating it to a non-fusing temperature and then stretching it longitudinally while preventing it from narrowing, thereby reducing the gauge and increasing the area of the strip, and thereafter manipulating the softened stretched strip at the wrapping station to enclose the article and heating the strip to a fusing temperature to seal the enclosed article.

12. Packaging apparatus having a wrapping station and comprising, in combination, means for advancing a sheet of heat-stretchable material to the wrapping station, means for heating the sheet in its advance and for stretching it linearly to increase its area before it reaches the wrapping station, and means for manipulating the heated and stretched advancing sheet at the wrapping station to enclose the article to be wrapped.

13. Packaging apparatus having a wrapping station and comprising, in combination, means for advancing a sheet of heat-stretchable material to the wrapping station, means for heating the sheet in its advance and for simultaneously stretching it linearly to increase its area before it reaches the wrapping station, said heating and stretching means comprising a heated roller which makes direct contact with the advancing sheet and is operated at a peripheral speed greater than the linear speed of travel of the advancing sheet, and means for manipulating the heated and stretched advancing sheet at the wrapping station to enclose the article to be wrapped.

14. Packaging apparatus having a wrapping station and comprising, in combination, means for advancing opposed sheets of heat-stretchable and heat-sealable material to the wrapping station, means for heating the sheets in their advance and for stretching them linearly to increase their area, before they reach the wrapping station, and means for pressing the sheets into heat-sealing engagement at the wrapping station about the articles to be wrapped to form a series of individual packages.

15. Packaging apparatus having a wrapping station and comprising, in combination, means for advancing opposed sheets of heat-stretchable and heat-sealable material to the wrapping station, means for heating the sheets to render them sufficiently stretchable before reaching the wrapping station, additional means for heating the sheets at the wrapping station to render them sealable, and means for pressing the sheets into heat-sealing engagement at the wrapping station about the articles to be wrapped to form a series of individual packages.

16. Packaging apparatus having a wrapping station and comprising, in combination, means for advancing opposed sheets of heat-stretchable and heat-sealable material to the wrapping station, means for heating the sheets to render them sufficiently stretchable before reaching the wrapping station, additional means for heating the sheets at the wrapping station to render them sealable, means for pressing the sheets into heat-sealing engagement at the wrapping station about the articles to be wrapped to form a series of individual packages, and still further heating means for cutting through the heat-sealed sheets between the individual packages.

FRED B. PFEIFFER.

REFERENCES CITED

The following references are of record in the file of this patent:

UNITED STATES PATENTS

| Number | Name | Date |
|---|---|---|
| 892,702 | Wyman | July 7, 1908 |
| 1,481,866 | Heist | Jan. 29, 1924 |
| 1,856,694 | De Correvont | May 3, 1932 |
| 2,141,318 | Salfisberg | Dec. 27, 1938 |
| 2,146,308 | Maxfield | Feb. 7, 1939 |
| 2,155,445 | Pittenger et al. | Apr. 25, 1939 |
| 2,166,643 | Salfisberg | July 18, 1939 |
| 2,168,651 | McCoy | Aug. 8, 1939 |
| 2,210,509 | Strauch | Aug. 6, 1940 |
| 2,232,783 | Hausheer | Feb. 25, 1941 |
| 2,340,106 | Brown | Nov. 3, 1942 |
| 2,302,846 | Farmer et al. | Nov. 24, 1942 |
| 2,327,170 | Calvert | Aug. 17, 1943 |
| 2,340,260 | Clunan | Jan. 25, 1944 |
| 2,342,977 | Snyder | Feb. 29, 1944 |
| 2,403,482 | Cloud | July 9, 1946 |
| 2,490,781 | Cloud | Dec. 13, 1949 |